United States Patent [19]

Eccleston et al.

[11] 4,291,192

[45] Sep. 22, 1981

[54] VENTING APPARATUS FOR AN ELECTRIC CABLE POTHEAD

[75] Inventors: Thomas F. Eccleston, Jeanette; Walter M. Wilson, Greensburg, both of Pa.

[73] Assignee: Consolidated Edison Company of New York, Inc., New York, N.Y.

[21] Appl. No.: 145,592

[22] Filed: May 1, 1980

[51] Int. Cl.³ .............................................. H02G 15/22
[52] U.S. Cl. .................................. 174/11 BH; 174/19
[58] Field of Search .............. 174/11 R, 11 BH, 12 R, 174/12 BH, 14 BH, 18, 19, 20, 21 R

[56] References Cited

U.S. PATENT DOCUMENTS 3,013,101 12/1961 Domenach .......................... 174/19 X

FOREIGN PATENT DOCUMENTS 154695 10/1938 Austria ................................ 174/11 R
439575 12/1935 United Kingdom .................. 174/19

Primary Examiner—Laramie E. Askin

Attorney, Agent, or Firm—Brooks, Haidt, Haffner & Delahunty

[57] ABSTRACT

A pothead installation for a high voltage, high pressure oil-filled, electric cable in which the pothead is surrounded by a metal tank at ground potential, the tank being filled with sulfur hexafluoride gas under pressure. Oil and nitrogen within the pothead are conveyed to the exterior of the tank by a tube of insulating material having electrical characteristics and a length adequate to withstand at least the voltage difference between the cable conductor and the tank and having physical characteristics adequate to withstand at least the pressures of the oil and nitrogen. At the end of the tube at the tank wall, the tube is connected to a reservoir which is mounted exteriorly of the tank and which accumulates the oil and nitrogen. The reservoir has a venting valve for venting the nitrogen and oil, has a sight gauge for monitoring the oil level in the reservoir, and may have a float switch connected thereto for operating an alarm when the volume of the nitrogen exceeds a predetermined value.

16 Claims, 3 Drawing Figures

FIG. I.

VENTING APPARATUS FOR AN ELECTRIC CABLE POTHEAD

This invention relates to venting and monitoring apparatus primarily intended for use with a known type of pothead which terminates an oil-filled electric cable and which is conventionally surrounded by a housing.

It is known in the art to terminate an oil-filled cable with a pothead having a venting valve, and to surround such pothead with a housing or tank at ground potential which is filled with an insulating gas, such as sulfur hexafluoride. The potential of the cable conductor may be several hundred kilovolts, and the oil pressure may be 200 p.s.i.g. or more. The gas pressure may be 50 p.s.i.g. or less.

Great pains are taken to minimize moisture and dissolved gasses in the oil of the cable. However, some dissolved gasses are always present, particularly nitrogen which is used to keep the pipes dry prior to evacuation and filling with oil and which is used to keep the oil under pressure. If dissolved gasses are released in the form of gas bubbles, as might happen upon a reduction of oil pressure, the bubbles naturally tend to rise to the highest points in the cable system. Since the highest points are usually the potheads at the cable terminations, the nitrogen tends to accumulate inside the porcelain bushings of the potheads.

When nitrogen accumulates in the potheads, the dielectric strength of the paper roll insulation is greatly reduced, and normal line-to-ground voltage is sufficient to puncture the paper insulation. The resultant internal arc, releasing megawatts of electric energy inside the pothead, builds up very high internal pressures in a few cycles. The combination of thermal shock and high pressure can, and does, cause an explosion of the pothead porcelain.

In addition, the gas in the housing should not become contaminated with the cable oil. Potheads can also fail or leak oil into the gas system because of operator error in the control of the oil pressure, system disturbances, etc.

In conventional outdoor potheads for pipe-type cable, a bleeder valve is located at the top of the pothead porcelain so that gases trapped inside can be bled off by opening the bleeder valve until gas is bled off and oil appears. This process, of course, requires that the cable be de-energized and grounded while a man in a bucket truck is lifted to the top of the pothead to open the bleeder valve.

Potheads in gas-insulated substations usually are completely enclosed in aluminum housings and surrounded by $SF_6$ gas under pressure of several atmospheres. To bleed gases from a gas-insulated substation pothead, it has been necessary to remove the $SF_6$ gas from the pothead enclosure, allow air to refill the enclosure to atmospheric pressure, remove the cover from the pothead enclosure, then open the bleeder valve until oil appeared. After venting, the interior of the enclosure must be thoroughly cleaned and dried. Any oil which may issue from the bleeder valve would tend to run down over the greatly foreshortened porcelain bushing and accumulate in the bottom of the pothead enclosure, where it is very difficult and time-consuming to clean out. After cleaning and replacing the cover, it has then been necessary to evacuate the pothead enclosure, check it for leaks, and refill it with $SF_6$ gas to the nominal density before re-energization.

In addition to the disadvantages of the time, equipment and labor involved in such venting, it is necessary that the cable be out of service for the time taken to perform the various tasks involved. Furthermore, the various tasks are hampered when the weather is inclement.

Continuous monitoring of the nitrogen-oil interface, which should be kept at a safe level, also is desirable, but conventional pothead-housing assemblies do not have this facility.

One object of the invention is to provide apparatus which will permit the venting of a pothead from exteriorly of the sealed and gas-filled housing enclosing the pothead.

Another object of the invention is to provide apparatus which permits continuous monitoring of the nitrogen-oil interface and which may be used to operate an alarm when the nitrogen volume exceeds a safe level.

A further object of the invention is to provide a reservoir for the nitrogen which will permit some accumulation of nitrogen without placing the pothead in immediate jeopardy.

In accordance with the presently preferred embodiment of the invention, a tube of insulating material of a quality and length sufficient to withstand the difference in potential between the cable conductor and ground is connected to the conventional manually operable venting valve which is at the pothead and which is left in its open position after the apparatus of the invention is installed. The tube extends to a reservoir mounted on, but exteriorly of, the pothead housing or enclosure. Preferably, the reservoir has a transparent level gauge connected thereto to permit visual observation of oil level. Preferably, also, the reservoir has a float type switch associated therewith and responsive to the oil level to operate an alarm when the oil level reaches a predetermined limit. A manually operable valve on the reservoir permits the removal of nitrogen and oil from the reservoir.

Other objects and advantages of the present invention will be apparent from the following detailed description of the presently preferred embodiments thereof, which description should be considered in conjunction with the accompanying drawings in which.

Figure 1:
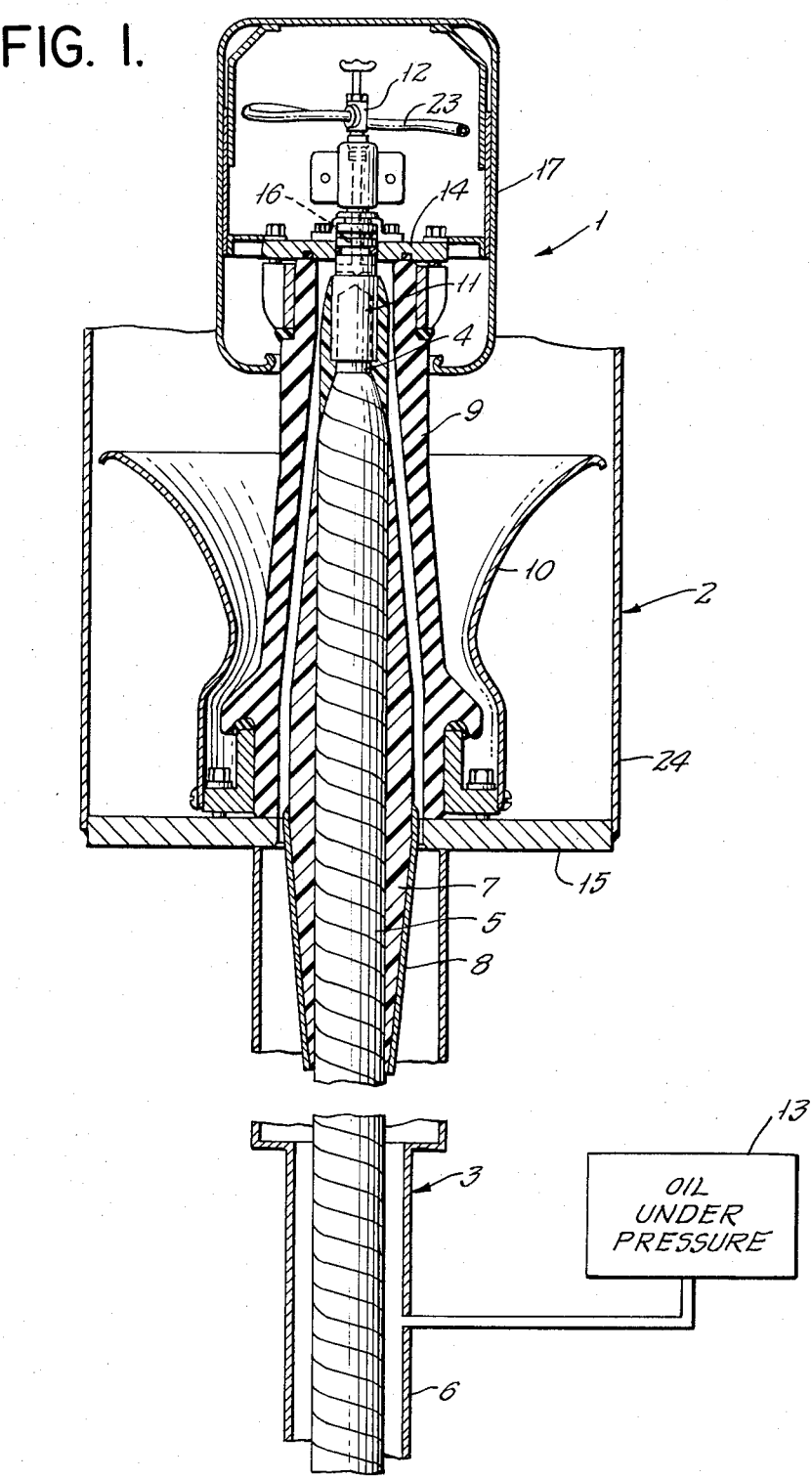
FIG. 1 is a longitudinal, cross-sectional view of a typical pothead (except for the tube 23) with which the apparatus of the invention may be used.

The invention is applicable to various types of pothead installations in which the pothead is surrounded by a sealed enclosure or tank, but the invention will be described in connection with a pothead known in the art as a 345 kilovolt, mini-sub pothead and used to terminate a high pressure, oil-filled cable. FIG. 1 illustrates such a pothead 1 which is enclosed by a metal tank 2 containing sulfur hexafluoride gas under pressure, e.g. at a pressure of 50 p.s.i.g. or less.

FIG. 1 does not illustrate all the details of the construction of the cable 3 terminated at the pothead 1 and does not illustrate all the elements in the connection of the cable 3 to the pothead since the further details are well-known in the art and are not necessary to an understanding of the invention. The cable 3 comprises a central conductor 4 surrounded by insulation 5, and the insulation 5 is surrounded by a metallic sheath in the form of a metal pipe 6. The insulation 5 is covered by a stress relief cone 7 part of which is covered by metal 8.

The end of the cable 3 is received within the bore of a rigid insulator 9, e.g. made of porcelain, which is surrounded by a metal shield 10 at ground potential. The cable conductor 4 is secured to one end of a metal sleeve 11, the other end of the sleeve 11 having a manually operable metal valve 12 secured thereto. Oil under pressure, e.g. a pressure of 200 p.s.i.g. or more, is supplied to the interior of the pipe 6 from a source 13 and flows around the exterior of the insulation 5 and the cone 7 into the bore of the insulator 9. The oil also penetrates into the insulation 5 and flows along the interstices of the stranded conductor 4. The upper end of the insulator 9 is closed by a plate 14, and the lower end thereof is in fluid tight relation with the wall 15 of the tank 2. Fluid within the bore of the insulator 9 flows to the valve 12 by way of a passageway 16. The valve 12, the plate 14 and the upper end of the insulator 9 are surrounded by a metal corona shield 17.

Figure 2:
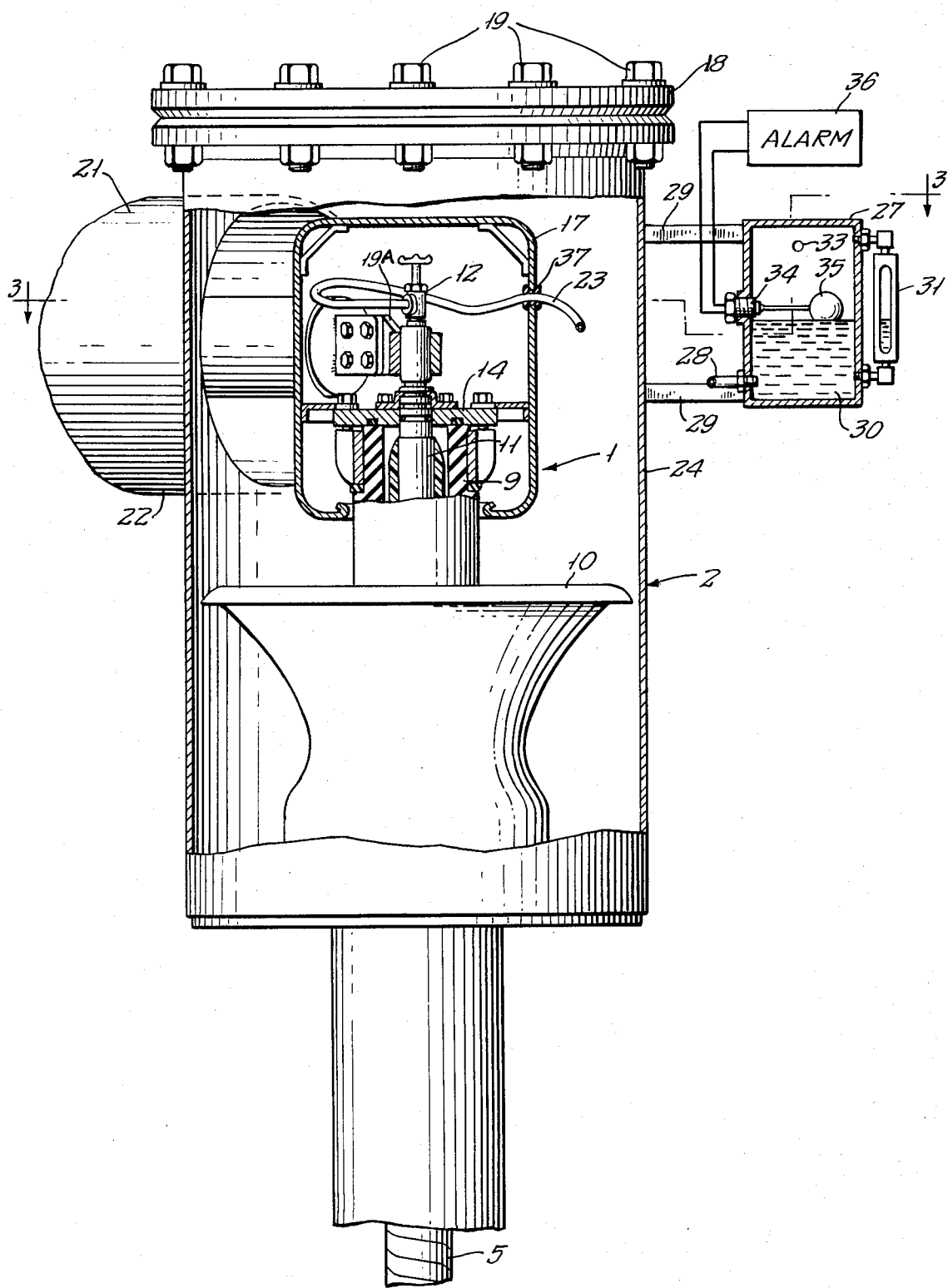
FIG. 2 is an elevation view, partly in section, of the pothead shown in FIG. 1 and the apparatus of the invention.

As illustrated in FIG. 2, the upper end of the tank 2 has a cover 18 secured to the tank 2 by a plurality of bolts 19, and as described hereinbefore, it has been necessary in the prior art to remove the cover 18 to obtain access to the valve 12 when it has been necessary to remove fluid from within the insulator 9. The disadvantages of such prior art methods have been described hereinbefore.

Electrical connections to the cable 3 are made by way of a connector 19A secured to the sleeve 11. Thus, the center conductor 20 (FIG. 3) of an electrical line 21, the outer conductor 22 of which is filled with the sulfur hexafluoride gas contained in the tank 2, is secured to the cable 3 by the connector 19A secured to sleeve 11.

Figure 3:
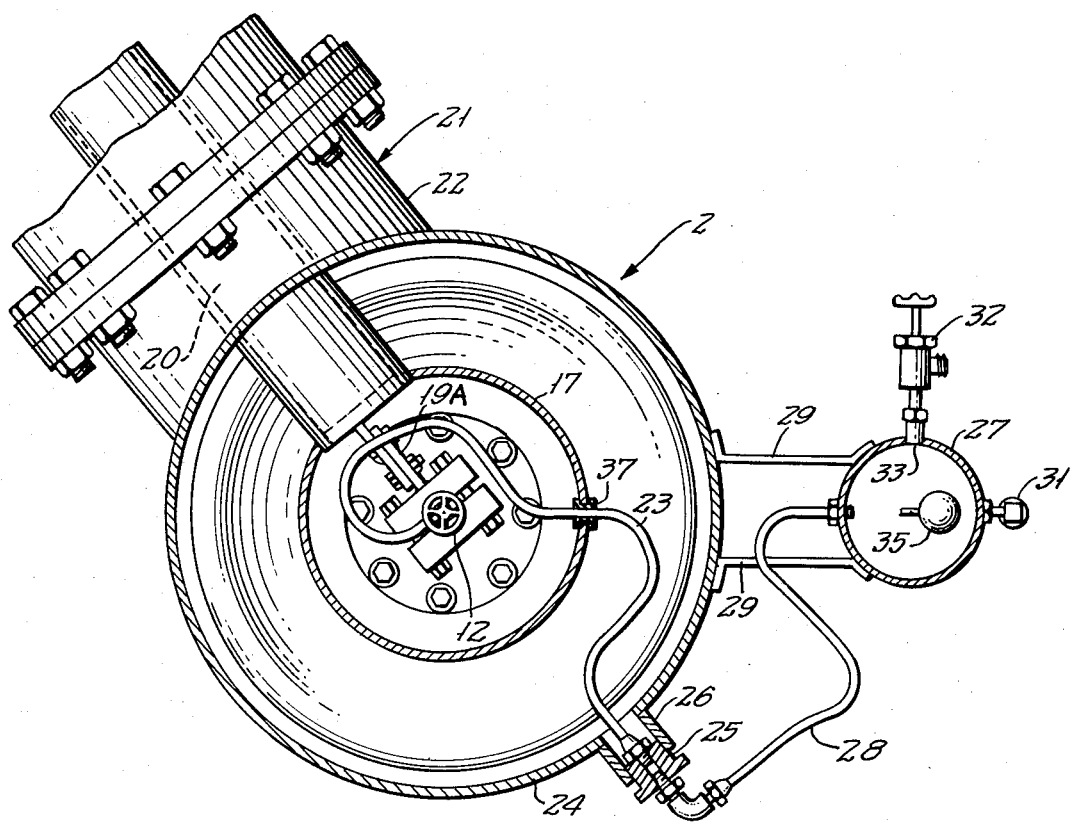
FIG. 3 is an end view, partly in section, of the embodiments shown in FIG. 2, as seen from lines 3—3 therein.

The parts and the arrangement thereof described hereinbefore in connection with the drawings are typical of a pothead-tank installation. In accordance with the invention, and with reference to FIGS. 2 and 3, the valve 12 has a tube 23 of insulating material connected thereto and extending to an exterior wall of the tank 2. In the preferred embodiment as illustrated in FIG. 3, the tube 23 extends to the sidewall 24 of the tank 2 where it is connected in fluid tight relation to a fitting 25 which is secured in fluid tight relation to a sleeve 26 and which is at ground potential. The sleeve 26 is secured to the wall 24 in fluid tight relation thereto, such as by welding or brazing. The fitting 25 is connected to a reservoir 27 by a tube 28 which may or may not be made of insulating material but which may be of the same construction as the tube 23. The reservoir 27 is mounted on the sidewall 24 in any suitable manner, such as by the brackets 29, with at least the upper end of the chamber thereof above the lower side of the plate 14 so that the gas in the pothead will rise into the reservoir 27.

When the valve 12 is open, fluid, i.e. gas and oil, within the bore of the insulator 9 flows by way of the sleeve 11, the valve 12 and the tubes 23 and 28 to the reservoir 27, and the gas will be in the upper part of the reservoir 27. Oil 30 will occupy most of the reservoir 27 in normal operation, and the level of the oil 30 will be indicated by a sight gauge 31 in fluid communication with the interior of the reservoir 27. Fluid may be removed from the reservoir 27 by way of a manually operable valve 32 in fluid communication through the opening 33 with the interior of the reservoir 27.

Preferably, an electrical switch 34 is mounted on a wall of the reservoir 27 and is operable by a float 35 which floats on the top of the oil 30. The switch 34 is connected in a known manner to an alarm 36, either audible or visible or both, so that when the level of the oil 30 in the reservoir 27 lowers below a desired value, the alarm 36 is operated.

It will be observed that one end of the tube 23 is at high potential, the potential of the conductor 4 with respect to ground which is the potential of the tank 2, since it is connected to the metal valve 12 which in turn is connected to the conductor 4 by the metal sleeve 11. The tube 23 passes through the shield 17 which is at the potential of the conductor 4, and is protected mechanically by a grommet 37 of insulating material which is not used to prevent voltage breakdown between the tube 23 and the shield 17. The opposite end of the tube 23 is connected to the conductive fitting 25 which is at ground potential. Also, the fluid within the tube 23 and within the reservoir 27 is at the pressure of the oil supplied by the source 13, the oil normally being maintained under pressure by compressed nitrogen in the source 13 and in contact with the oil. Therefore, the material, construction and length of the tube 23 must be such as to withstand the normal potential, and higher impulse voltages, between the conductor 4 and the tank 2 and such as to withstand the pressure of the fluids contained therein. Therefore, the material, construction and length of the tube 23 must be selected by test because it is not merely a matter of interconnecting the valve 12 and the fitting 25 by a tube 23 of a material, construction and length selected at random. In fact, many tests with different tubes 23 of different lengths were required before it was determined that it was feasible to conduct the fluids from the valve 12 to the outside of the tank 2 by means of a tube 23. The information set forth hereinafter will teach those skilled in the art the manner of selecting a suitable tube 23.

One of the first considerations in selecting the materials and construction of a tube 23 is the ability of the tube 23 to withstand the pressure of the fluids at the valve 12. Thus, the tube 23 must be able to withstand the maximum foreseeable pressure plus an additional amount for safety reasons. In the case of a cable having a normal fluid pressure of about 200 p.s.i.g., the tube 23 should be tested for its ability to withstand a pressure several times 200 p.s.i.g., e.g. 1000 p.s.i.g.

With the tube 23 connected between the valve 12 and the fitting 25, the tube 23 is then subjected to electrical tests including the application of sine wave voltages and impulse voltages between the valve 12 and the fitting 25 and standard partial discharge tests. Such tests should be conducted with the tube 23 partially, as well as completely, filled with the cable oil, and with the remainder of the tube 23 filled with the gas, e.g. dry nitrogen, used to pressurize the oil. Also, such electrical tests should be made with several nitrogen pressures and with the sulfur hexafluoride gas pressure at its normal value.

For example, a tube 23 of the following dimensions and construction and sold by Imperial Eastman under the trademark HYTRON, catalogue No. L404, was tested:

Core tube—virgin polyamide ¼ in. inside diameter.
Outside diameter—0.508 inch.
Reinforcement—two layers of polyester braid on outside of core tube Covering—Wear resistant, flame retardant, thermoplastic bonded mechanically to the braid without pin perforations.

Maximum working pressure—2750 p.s.i.

The manufacturer's literature indicates that the tube is further described in U.S. Pat. Nos. 3,172,427 and 3,332,447. The tube may be used at operating temperature from −40° to +95° C. and is substantially unaffected by flammable oils or non-flammable hydraulic oils up to 95° C.

On the assumption that the nominal working voltage of the cable would be 362 kilovolts at 60 Hz, a tube 23 having a length of fourteen inches between the shield 17 and the fitting 25 was subjected to pressure and 60 Hz tests. The tube 23 withstood pressures up to 1500 p.s.i.g., and while it withstood voltages up to 400 and 500 rms kilovolts for one minute, with oil under nitrogen pressure of 50 p.s.i.g. and at a level midway between the valve 12 and the shield 17 and with $SF_6$ at a pressure of 26 p.s.i.g. in the tank 2, an arcover occurred at 555 rms kilovolts within seven seconds which was unsatisfactory.

The length of the tube 23 between the shield 17 and the fitting 25 was increased to twenty-eight inches, the 60 Hz test was repeated and it was found that arcover did not occur when the tube 23 was subjected to 400, 500 and 555 rms kilovolts respectively for one minute.

The tube 23 was then tested for partial discharges using a Biddle Discharge Detector, and no partial discharge occurred at up to 420 rms kilovolts either before or after an impulse test in which consecutive standard 1.2×50 microsecond voltage impulses were applied to the tube 23 at its ends.

Ten positive and ten negative impulses respectively having peak values of 1059 kilovolts and 1052 kilovolts were applied and no breakdown occurred.

The pressure of the fluids in the tube 23 was increased to 150 and then to 500 p.s.i.g. and substantially the same electrical tests were repeated with similar results.

The oil level in the tube 23 was raised to midway between the shield 17 and the wall 24 of the tank 2 and substantially the same electrical tests with the different fluid pressures were repeated with similar results.

The oil level was then increased until it was about midway between the top and the bottom of the reservoir 27, and substantially the same electrical tests with the different fluid pressures were repeated with similar results.

Accordingly, the test results show that a tube 23 made and constructed as described can withstand fluid pressures at least up to 1500 p.s.i.g., steady state 60 Hz voltages up to 555 rms kilovolts (approximately 1.5 times operating voltage) and peak voltage impulses of approximately 1060 kilovolts and is free of partial discharges up to at least 420 rms kilovolts with fluid pressures up to 500 p.s.i.g. and with various oil levels in the tube 23 or in the reservoir 27 provided that the steady state voltage does not exceed about 19 rms kilovolts per inch of length of the tube 23. However, when the voltage stress is about 40 rms kilovolts per inch, arcover occurs.

As a result of the tests conducted, it has been concluded that a tube 23 of insulating material can be used to convey fluid from the valve 12 of a pothead 1 to the exterior of the tank 2 for venting and monitoring purposes provided that it has the following characteristics:

Operating pressure—at least twice and preferably five times the pressure of the cable oil.

Length and materials—sufficient to withstand 1.5 times steady state cable operating voltage, without partial discharge at 1.1 times the cable operating voltages and sufficient to withstand peak voltage impulses of at least twice the cable operating voltage.

Resistance to fluids—substantially unaffected by cable oils and a gas used to pressurize the oils at temperatures up to 75° C. and preferably up to 95° C. and substantially unaffected by the gas, e.g. $SF_6$, in the tank 2.

Operating temperature—in the range from −20° C. to +75° C. and preferably from −40° C. to +95° C.

It will be noted that the characteristics of L404 tube exceed the minimum characteristics set forth hereinbefore and is, therefore, the presently preferred tube 23. However, other tubing of sufficient length may be used. On the other hand, the length of the tubing must be such that it can be located within the space between the tank 2 walls and the shield 17 so that arcover does not occur between the tube 23 and either the shield 17 or the tank 2 walls and so that a higher potential portion of the tube 23 is far enough from a lower potential portion of the tube 23 to prevent arcover between such portions. In other words, the length of the tube 23 cannot be increased indefinitely for the purpose of compensating for low dielectric properties of the material used for the tube 23.

The apparatus of the invention may be installed on original pothead-tank equipment or installed on such equipment already in the field. After the pothead and tank equipment with the apparatus of the invention have been installed on a cable 3 with the valve 12 closed, oil under pressure is supplied to the cable 3 from the source 13. The valves 12 and 32 are opened and oil 30 is permitted to flow into the reservoir 27 until the oil level is at the upper end of the sight gauge 31, at which time the valve 32 may be closed. Alternatively, oil may be permitted to flow out of the valve 32 before it is closed. Preferably, the tube 23 is filled with oil during operation of the cable 3, and the size of the reservoir 27 is determined by the amount of nitrogen generated at the pothead 1 and the time interval between inspection of the equipment or venting thereof. Typically, the reservoir 27 may have an internal height of about nine inches and an internal diameter of about six inches. The nitrogen will be collected at the upper part of the reservoir 27, rather than in the pothead 1, where it will not affect the dielectric strength of the pothead 1. The nitrogen may be vented by opening the valve 32 and without opening the tank 2. As nitrogen accumulates in the upper end of the reservoir 27, the upper level of the oil 30 lowers which permits the float 35 to lower. The switch 34 and the float 35 are adjusted so that when the upper level of the oil 30 is at a selected level due to the accumulation of nitrogen in the reservoir 27, the switch 34 will close and operate the alarm 36 which may be located remotely with respect to the tank 2. The level of the oil 30, and hence, the accumulation of nitrogen in the reservoir 27 may be monitored by visual observation of the sight gauge 31.

In addition to removing the nitrogen from the electric field within the tank 2, the reservoir 27 permits the accumulation of more nitrogen than can be accumulated in the pothead 1 without damage.

Since the portion of the tube 23 is within the shield 17, it is not subjected to voltage stresses by reason of any field within the shield 17. For shielding purposes, it is desirable to keep the grommet 37 as small as possible, and it is not intended that it withstand operating voltage applied between the tube 23 and the shield 17. In fact, the grommet 32 may be conductive or semi-conductive if desired provided that it assures mechanical protection of the tube 23 as it passes through the shield 27. For purposes of selecting the length of the tube 23 extending between the grommet 37 and the fitting 25, the tube 23 may be considered to be at the potential of the shield 17 where it contacts the grommet 37.

Although the invention has been disclosed in connection with the venting of a pothead, it will be apparent to those skilled in the art that the invention may be used to monitor and vent fluids from parts of a different electrical installation which contain fluids under pressure, the tube 23 being connected so as to convey the fluids from a high potential part to a part at ground potential. Also, while it is preferred to use two tubes 23 and 28 so that the tube 23 will be securely grounded at the wall 24 of the tank 2, a single tube 23 which extends from the valve 12 to the reservoir 27 may be used provided that suitable precautions are taken to avoid any potential difference between the exterior of the portion of the tube 23 outside the tank 2 and the tank 2 itself. Furthermore, if desired, the tube 23 may be connected for fluid communication with the interior of the insulator 9 other than by way of the valve 12, such as by way of an opening in the plate 14, and if desired, an over-pressure, safety valve may be connected to the reservoir 27 to vent fluids from the reservoir 27 in the event the pressure of the fluids exceeds a safe value.

Although preferred embodiments of the present invention have been described and illustrated, it will be apparent to those skilled in the art that various modifications may be made without departing from the principles of the invention.

What is claimed is:

1. In combination with a housing enclosing a portion of an electrical cable which operates at a predetermined voltage which is different from the voltage of said housing, said cable having fluid under pressure above atmospheric pressure therein, venting means for venting fluid from said cable exteriorly of said housing, said venting means comprising a tube of insulating material connected in fluid communication with a portion of said cable at said predetermined voltage and extending to at least a wall of said housing for conveying fluid out of said cable and to the outside of said housing, a closed reservoir externally of said housing and connected to said tube for receiving fluid from said cable, and means connected to said reservoir for venting said fluid from said reservoir, said tube having a length and being made of an insulating material which has physical and electrical properties which will withstand the pressure of said fluid and withstand said voltage without breakdown.

2. The combination as set forth in claim 1 wherein said fluid comprises oil and said tube is filled with said oil.

3. The combination as set forth in claim 2 wherein said oil has pressure applied thereto by an inert gas under pressure and in contact with said oil.

4. The combination as set forth in claim 3 wherein said reservoir is partly filled with said oil and partly filled with said gas.

5. The combination as set forth in claim 4 further comprising a sight gage connected to said reservoir for indicating the level of the oil in said reservoir.

6. The combination as set forth in claim 4 or 5 further comprising a float switch connected to said reservoir and responsive to the oil level in said reservoir, and means connected to said switch and responsive thereto when the level of the oil in said reservoir is at a predetermined level.

7. The combination as set forth in claim 4 wherein said tube is made of a virgin polyamide, and has a voltage breakdown strength of at least 19 kilovolts per inch and can withstand pressure of oil therein of at least 500 p.s.i.g.

8. The combination as set forth in claim 4 wherein said housing contains an insulating gas other than air under pressure.

9. The combination as set forth in claim 1 wherein said cable has a conductor at said predetermined voltage and further comprising a pothead at an end of said cable and in sealed relation thereto, said pothead having a portion which is connected to the conductor and which receives said fluid, and means connecting said tube in fluid communication at one end with said portion of said pothead.

10. The combination as set forth in claim 9 wherein said means connecting said tube to said portion of said pothead comprises a manually operable valve.

11. The combination as set forth in claim 9 or 10 wherein said portion of said pothead is at an elevation above said cable and wherein at least a portion of the interior of said reservoir is above said portion of said pothead.

12. In combination with electrical apparatus comprising a conductor enclosed by a sealed enclosure, said conductor operating at a predetermined voltage with respect to ground potential and said conductor having insulating fluids under above atmospheric pressure therearound, venting means for removing said fluids from adjacent said conductor to a point at lower potential, said venting means comprising a sealed reservoir spaced from said conductor and outside of said enclosure, said reservoir being at said lower potential, a tube of insulating material in fluid communication at one end with the fluids around said conductor and connected at its opposite end to said reservoir for conveying said fluids into said reservoir, and means for removing said fluids from said reservoir, said tube having a length and being made of an insulating material which has physical and electrical properties which will withstand the pressure of said fluid and the potential difference between said voltage and said lower potential without breakdown.

13. The combination as set forth in claim 12 wherein said fluids are an insulating oil and an inert gas.

14. The combination as set forth in claim 13 wherein at least a portion of the interior of said reservoir is at an elevation above the fluids around said conductor.

15. The combination as set forth in claim 14 wherein said enclosure is a pothead and further comprising a sealed housing intermediate said enclosure and said reservoir.

16. The combination as set forth in claim 15 wherein said housing contains an insulating gas other than air under pressure.

* * * * *